Patented July 23, 1946

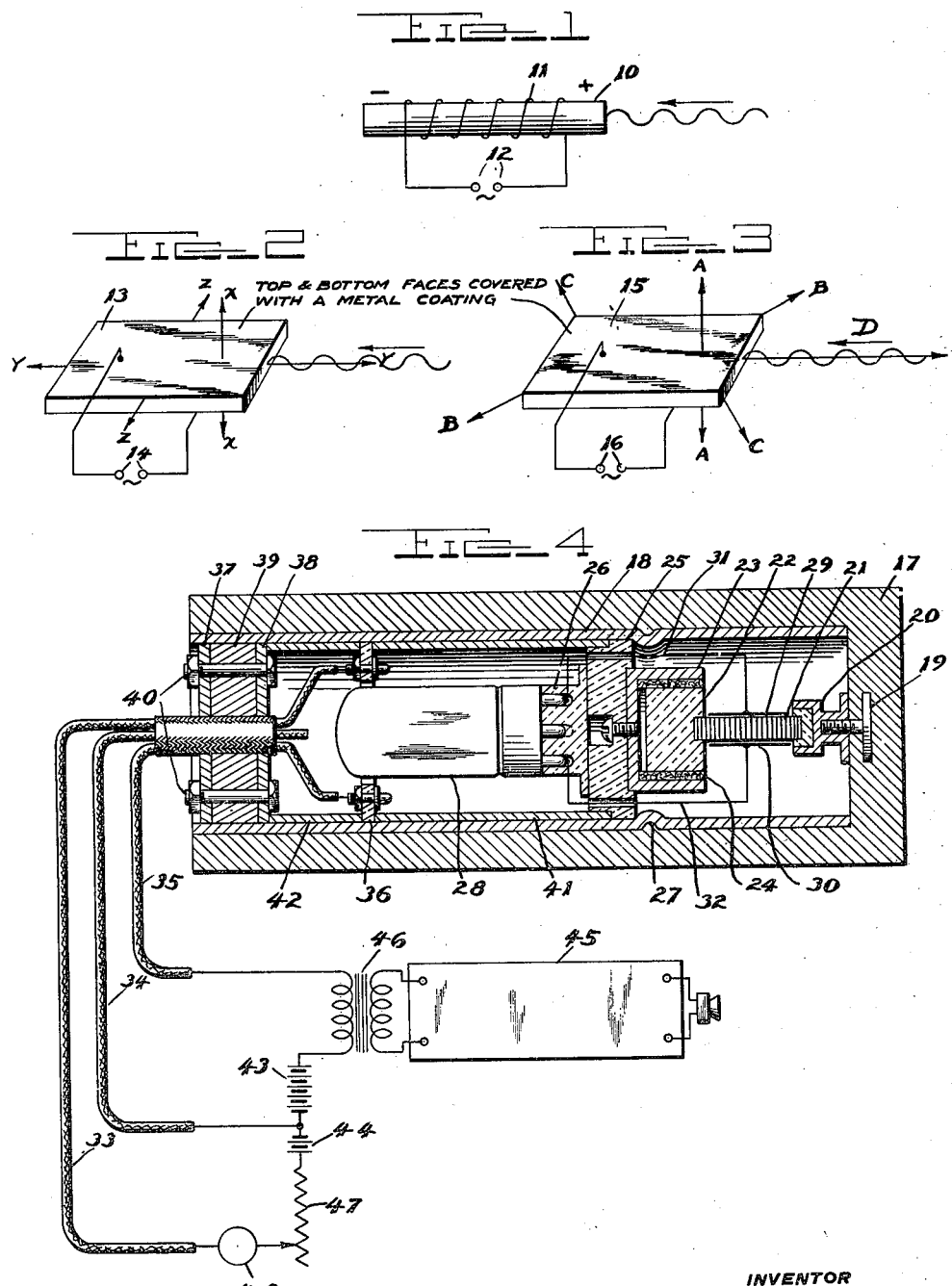

2,404,764

UNITED STATES PATENT OFFICE 2,404,764

SOUND RECEIVER

Harvey C. Hayes, Washington, D. C.

Application December 16, 1931, Serial No. 581,382

3 Claims. (Cl. 177—386)

(Granted under the act of March 3, 1883, as amended April 30, 1928; 370 O. G. 757)

This invention relates to sound receivers and more particularly to the improvement of the capacitive type of receiver.

The object of my improvement is to increase the sensitivity of capacitive types of sound receivers by reducing the loss due to distributed capacity in the leads that connect the detector to the amplifier.

With this and other objects in view, this invention consists in the construction, combination and arrangement of parts as will be described more fully hereinafter.

Sound receivers have not been uniformly sensitive over a comparatively wide band of frequencies and they have not been capable of reproducing faithfully the frequencies between the several components of the received sound. As a result it has not been possible to get the greatest accuracy from the various types of multispot receivers; that is, receivers employing a plurality of like detectors spaced along a straight or curved line in such a way that the pick-up on the several detectors can be brought into phase by bodily rotating the mounted detectors or by the use of compensators, because the several detectors not only fail to reproduce faithfully the relative intensities and phase relations between the received components of the sound waves but they also fail to give responses that are in agreement among themselves as regards distortion. In other words, the several detectors cannot be accurately matched. Such matching is a rigorous requirement of all the detector units of a sound receiver operating on either the maximum or the binaural principle if they are to give their best service.

Sound detectors in general give a reasonably faithful reproduction of phase relations for frequencies well below their fundamental resonant frequency and their sensitivity is fairly uniform within this region of the sound spectrum. However, it has not proved practical to employ such detectors because their extremely low sensitivity requires such high amplification that the cooperating amplifiers have a strong tendency to become unstable, and even when this trouble is overcome the inherent tube noise becomes so great as to partially, or at times wholly, mask the sound response of the detectors.

It is very difficult to make two diaphragms that respond identically to sound over a wide or even narrow band of frequencies, particularly when the two diaphragms are exposed to variations of temperature, pressure and corrosion as is the case for submarine sound detectors. Detectors that do not employ diaphragms are those which show electrical or magnetic effects due to the varying internal pressure gradients produced by sound waves. This is true of piezo-electric crystals such as tourmaline, quartz and Rochelle salt, and metals having magneto-strictive properties such as nickel, iron, cobalt and certain alloys. These materials have been tried in various combinations and go far towards giving the desired faithfulness of reproduction of relative sensitivity and phase and as a result permit of manufacturing matched units. They are all, however, extremely insensitive.

In the accompanying drawing:

Fig. 1 shows a magneto-strictive metal used as a sound detector;

Fig. 2 shows a quartz crystal used as a sound detector;

Fig. 3 shows a Rochelle salt crystal used as a sound detector;

Fig. 4 is a schematic diagram of my invention for use with a piezo-electric crystal detector.

In Fig. 1, a small metal rod 10 of magneto-strictive material, say nickel, which is magnetized as shown, is surrounded by a coil 11 of fine wire of many turns. The pole strength of the magnet can be varied by pressure exerted on the ends along the axis of the magnet. In the case of nickel, if the rod is compressed longitudinally, the poles become stronger and if stretched, they become weaker. Other materials may have the pole strength affected in the opposite sense. But in all cases, any change in pole strength causes the magnetic flux to cut across the coil windings and generate an electromotive force between its terminals and since sound waves impinging on the end of the bar, as shown diagrammatically, will generate pressure variations within the rod, they will also generate a varying electromotive force across the coil terminals 12. These electromotive forces are extremely weak and must be greatly amplified to be heard in phones or a loud speaker. It is obvious, however, that two such receivers could be made practically identical and therefore should match as regards response to the impinging sound waves. It is also obvious that the natural frequency of such rods to longitudinal distortions is normally high for anything but a long rod because the velocity of sound in metal is about 16,000 feet per second. Thus a free rod six inches in length will have a fundamental resonant frequency of 16,000 and will serve as an undistorted receiver of sounds below something like 12,000 cycles per second.

In Fig. 2, the quartz crystal 13 is shown properly cut with respect to the crystalline axes to serve our purpose. The right-to-left dimension is parallel with the so-called "Y" or pressure axis of the crystal. Pressure or extension of the slab along this direction generates equal and opposite charges on the top and bottom faces, the direction perpendicular to which is along the "X" or electrical axis of the crystal. The third or "Z" dimension is along the so-called optical axis of the crystal. Sound waves proceeding along the "Y" direction and striking the end of the crystal vary the pressure condition in the crystal along the "Y" axis and generate correspondingly varying charges on the "X" faces. The top and bottom faces (X faces) are coated with metal from which leads can be connected to carry the electrical charges. The sound waves striking the end of the crystal will cause varying pressures within the crystal which will generate varying charges on the electrodes which will give corresponding variations of electrical potential between the terminals 14. These potential variations are small and must be amplified highly before they can be reproduced again as sound of medium intensity.

In Fig. 3, a Rochelle salt crystal 15 is shown properly cut to serve our purpose. Its faces bear entirely different relations with respect to the crystallographic axes than do those of the quartz crystal. The directions of the axes are shown by arrows A, B and C. The top and bottom faces, which carry the electrodes, are parallel to the B and C axes and all the other faces, the edges of the block, are parallel with the A axis and directed 45 degrees away from the B and C axes. Such a prepared crystal generates electrical charges on its electrodes in response to pressure variations along the direction indicated by the arrow D and as a result will respond electrically to sound waves striking it from this direction. It follows that sound waves striking such a crystal will produce variation of electrical potential between the terminals 16, which when amplified and converted into sound will faithfully reproduce the original sound. However, considerable amplification is required because the electrical responses of the crystal to the sound waves are weak, but less amplification is required than for the quartz crystal for the reason that the piezo-electric coefficient of the Rochelle salt is about one hundred times that of quartz, so that the required amplification is reduced in about this proportion.

The voltage response of these three types of sound detectors is too weak to convert directly into sound and must be amplified and as a result the sensitivity of each detector is equivalent to its response at the input terminals of the amplifier. This will in all cases be less than the voltage response at the detector terminals due to losses in the leads which ofttimes are necessarily long.

My invention has to do with increasing the practical sensitivity of these receivers, particularly the piezo-electrical type in which the lead losses are abnormally and inherently great, by eliminating these abnormal losses. The nature of these losses will now be considered.

In the magneto-strictive rod detector, a harmonic change in pressure on the end of the magneto-strictive element causes the magnetic flux to cut the several turns of the surrounding coil at such a changing rate as to generate substantially an alternating voltage of sinusoidal wave forms and the maximum voltage variation at the terminals of the coil will be greater than that at the terminals of the leads attached thereto due to the "IR" drop along the leads. In practice this drop can be made negligible by designing the coil so that its resistance is large with respect to that of the leads. However, in the case of the piezo-electric detectors or in fact any type wherein the detector response is of the nature of variation of an electrostatic charge, the capacity of the leads may be the main factor in determining the voltage variations reaching the input terminals of the amplifier and since these leads must be shielded to avoid stray pick-ups into the amplifier, their capacity becomes appreciable, a condition that we shall see is disadvantageous.

The piezo-electric detector, like an electrostatic one, is a condenser. The two conductive coatings form the two electrodes and the intervening crystal the dielectric. Let $C_d$ represent the capacity of the detector and let there be some change in pressure applied to the crystal end which will change the charge of this condenser by an amount Q. The resulting change in potential $V_d$ across the condenser terminals will be given by the relation:

$$V_d = \frac{Q}{C_d}$$

Now connect leads to the condenser terminals having a capacity $C_e$ and again energize the crystal with the same pressure change. The same charge Q will be developed but the resulting change of potential $V_e$ across the terminals will now be given by the relation:

$$V_e = \frac{Q}{C_d + C_e}$$

a value less than was given without the leads. The ratio of these two voltage variations becomes:

$$\frac{V_e}{V_d} = \frac{C_d}{C_d + C_e}$$

It is obvious that this ratio becomes unfavorable as the capacity of the leads $C_e$ becomes large in proportion to the capacity of the crystal detector $C_d$. In practice a very few feet of shielded cable have as much capacity as the crystal detector and, as a result, the length of cable required, particularly for underwater sound reception, is such that the natural voltage response of the detector is diminished by the cable by at least a factor of ten and in many cases by a much larger factor. It is obvious that a further decrease in the ratio $V_e/V_d$ is caused by the ordinary "$I^2R$" losses. The approximate elimination of these large cable losses is accomplished by designing the detector housing to include an amplifier tube. The lead from the detector to the grid of this tube can be made very short and of capacity very small in comparison with that of the detector element. Such a detector, particularly one that employs a Rochelle salt crystal for the sensitive element, has proved to give faithful reproduction of the received sounds and to show good sensitivity over a wide range of frequencies. Moreover, there seems to be no difficulty in suitably matching such receivers for use in multiple combination or in using almost any desired length of cable between the detector combination and the amplifier.

My invention, therefore, consists of a capacitive sound receiving element and an amplifier tube carried in a water-tight housing with the two terminals of the detector connected respectively to the filament and grid of the amplifier tube in such a manner as to make the capacity of the combination a minimum so far as is permitted by good practice in design and construction. In Fig.

4 my invention is shown schematically, wherein 17 indicates a molded rubber housing inside of and cemented to which is a metal tube 18. Centered and molded in the end portion of 17 is an anchor stud 19 to which is attached threaded member 20 which is cemented to one end of the crystal 21. An inertia member 22 is cemented to the other end of the crystal 21 and this in turn is held centered by a surrounding cup 23 but is permitted to move in an axial direction along the felt lining 24 of the cup 23. This arrangement relieves the crystal from strains that might be produced by abnormal pressures on the diaphragm such as would be encountered when the receiver is submerged to various depths in water but still leaves the crystal subject to the small pressure variations produced by sound waves impinging upon the rubber outside of member 19. Bakelite or hard rubber disk 25 serves for mounting the cup 23 on its inner face and for mounting amplifier tube base 26 on the opposite side. This disk shoulders against an inward projecting ring 27 rolled into the tube 18. The amplifier vacuum tube 28 seats into the base 26 in accordance with standard practice. The crystal electrodes 29 and 30 are connected to the filament and grid respectively by short leads 31 and 32, each lead threading through a separate small hole in disk 25. In this way the capacity of the crystal leads is kept small by making the leads short and well separated. The three cable leads 33, 34 and 35 attach respectively to the separate filament terminals and the plate, and to avoid running the comparatively heavy stiff wires of the cable down between the amplifier tube and the casing, they attach to terminals on the ring insulator 36 and from these three terminals light, flexible jumpers connect to the respective base terminals. The casing is closed water-tight by a sandwich type of packing consisting of two metal disks 37 and 38 with an intervening soft rubber disk which when compressed by the lag bolts 40 expands tightly against the inside of the casing 18 and the outside of the cable. To provide for a seating of the sandwich packing and for holding disk 25 and ring 36 in position, two tubular sleeves 41 and 42 are inserted as shown. For operation, a battery 43 of proper voltage is connected across filament and plate at the outer cable terminals and a battery 44 is connected across the filament terminals in accordance with standard practice.

If a grid bias battery is required, it can be supplied by adding a fourth lead to the cable or by taking a potential drop across a proper resistance incorporated in the receiver and connected in series with the filament. The amplifier 45 may be of any type and the output from the receiver can be coupled to the amplifier by any of the several ways employed in standard practice. A transformer coupling 46 is shown in the drawing. The ammeter 48 and variable resistance 47 should be provided for adjusting the filament current to the proper value.

By combining an amplifier tube and a crystal within the same housing, so that charges generated by the crystal are not spread over the cable leads but are concentrated almost entirely on the grid, the sensitivity of the combination is increased many-fold over and above what it is when the cable leads are interposed between the detector element and the amplifier tube. This gain is not lost through the cable because the cable now carries only currents generated by the amplifier tube. Such currents are only subject to the "IR" drop along the cable and, as shown, this loss can be made very small by proper design of the cable and its terminal impedances.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalties thereon.

I claim:

1. A submarine sound receiver including a cylindrical casing having a diaphragm at one end thereof and being open at the other, means engaging the inner wall of said casing near said one end and forming a chamber, a piezo-electric crystal between said diaphragm and said means and held by the latter to cause the diaphragm to cooperate with the crystal, means closing the open end of the casing and forming a second chamber for a vacuum tube, said receiver also including a conduit for the passage of an electrical connection between the crystal and vacuum tube.

2. A sound receiving device comprising a watertight casing, a sound vibratile diaphragm closing one end of said casing, a pair of electrodes disposed within said casing, a piezo-electric crystal mounted between said pair of electrodes, means affixed to the vicinity of the center of said diaphragm for transmitting vibratory motion from said diaphragm to one end of said piezo-electric crystal, an inertia element having in one face thereof a recess in which is secured the end of the crystal opposite said one end, a support fixed in said casing transversely thereof, a hollow guide fixed to said support, and a vibration damping lining in said guide, said lining fitting snugly around said element but permitting sliding movement of the element therein in response to steady sustained change of pressure on said diaphragm transmitted to said crystal.

3. A sound receiving device comprising a watertight casing, a sound vibratile diaphragm closing one end of said casing, a pair of electrodes disposed within said casing, a piezo-electric crystal mounted between said pair of electrodes, means affixed to the vicinity of the center of said diaphragm for transmitting vibratory motion from said diaphragm to one end of said piezo-electric crystal, an inertia element having in one face thereof a recess in which is secured the end of the crystal opposite said one end, a support fixed in said casing transversely thereof, a hollow guide fixed to said support, a vibration damping lining in said guide, said lining fitting snugly around said element but permitting sliding movement of the element therein in response to steady sustained change of pressure on said diaphragm transmitted to said crystal, a vacuum tube mounted on the side of said support opposite said guide, and conductors operatively connecting the control element of said tube to said electrodes.

HARVEY C. HAYES.